United States Patent
Astigarraga et al.

(10) Patent No.: US 11,194,690 B2
(45) Date of Patent: Dec. 7, 2021

(54) TRACKING AND FACTORING APPLICATION NEAR MISSES/TIMEOUTS INTO PATH SELECTION AND MULTIPATHING STATUS

(71) Applicant: INTERNATIONAL BUSINESS MACHINES CORPORATION, Armonk, NY (US)

(72) Inventors: Tara Astigarraga, Fairport, NY (US); Michael E. Browne, Staatsburg, NY (US); Louie A. Dickens, Tucson, AZ (US); Shariffa B. Siewrattan, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 14/281,377

(22) Filed: May 19, 2014

(65) Prior Publication Data
US 2015/0331731 A1 Nov. 19, 2015

(51) Int. Cl.
*G06F 11/34* (2006.01)
*G06F 11/07* (2006.01)
*G06F 11/30* (2006.01)

(52) U.S. Cl.
CPC ........ *G06F 11/3419* (2013.01); *G06F 11/076* (2013.01); *G06F 11/0745* (2013.01); *G06F 11/3041* (2013.01); *G06F 11/3466* (2013.01); *G06F 2201/81* (2013.01)

(58) Field of Classification Search
CPC ............. G06F 11/0751; G06F 11/0754; G06F 11/0757; G06F 11/076; G06F 11/0781; G06F 11/079; G06F 11/0793; G06F 11/20; G06F 11/2002; G06F 11/2005; G06F 11/2007; G06F 11/201; G06F 11/2017; G06F 11/22; G06F 11/221; G06F 11/2221; G06F 11/30; G06F 11/3006; G06F 11/3027; G06F 11/3034; G06F 11/3037; G06F 11/3041; G06F 11/3051; G06F 11/3055; G06F 9/5083; G06F 2009/4557; H04L 43/16; H04L 45/22; H04L 45/28; H04L 47/12; H04L 47/125; H04L 65/80
See application file for complete search history.

(56) References Cited

U.S. PATENT DOCUMENTS

| | | | |
|---|---|---|---|
| 6,018,300 A * | 1/2000 | Dowden | H04L 41/0681 340/635 |
| 6,078,919 A * | 6/2000 | Ginzburg | H04L 47/10 |
| 7,103,504 B1 | 9/2006 | McGlaughlin et al. | |
| 7,307,948 B2 | 12/2007 | Infante et al. | |
| 7,451,341 B2 | 11/2008 | Okaki et al. | |
| 7,668,981 B1 | 2/2010 | Nagineni et al. | |
| 7,716,381 B2 | 5/2010 | Ely et al. | |
| 8,289,845 B1 | 10/2012 | Baldonado et al. | |

(Continued)

*Primary Examiner* — Gabriel Chu
(74) *Attorney, Agent, or Firm* — Griffiths & Seaton PLLC (57) ABSTRACT

Various embodiments for management of multipath Input/Output (I/O) in a computing system by a processor device. Upon surpassing a threshold for at least one predetermined criterion associated with near timeouts/near misses in the multipath I/O, a system notification is provided that is usable by the processor device to perform a multipath layer path selection aimed at reducing near timeouts/near misses in the multipath I/O.

13 Claims, 3 Drawing Sheets

(56) References Cited

U.S. PATENT DOCUMENTS

| | | | |
|---|---|---|---|
| 2002/0065962 A1* | 5/2002 | Bakke | G06F 13/385 |
| | | | 710/38 |
| 2004/0078632 A1* | 4/2004 | Infante | G06F 3/0613 |
| | | | 714/4.2 |
| 2004/0157646 A1* | 8/2004 | Raleigh | H01Q 3/2605 |
| | | | 455/562.1 |
| 2005/0050377 A1* | 3/2005 | Chan | H04L 63/1433 |
| | | | 714/4.3 |
| 2005/0108444 A1 | 5/2005 | Flauaus et al. | |
| 2008/0008085 A1* | 1/2008 | Gerstel | H04L 12/14 |
| | | | 370/216 |
| 2009/0150536 A1* | 6/2009 | Wolman | H04L 67/1012 |
| | | | 709/224 |
| 2010/0268851 A1* | 10/2010 | Bauman | G06F 11/2007 |
| | | | 710/11 |
| 2014/0053014 A1* | 2/2014 | MacQuarrie | G06F 11/0793 |
| | | | 714/4.2 |
| 2015/0095498 A1* | 4/2015 | Tourrilhes | H04L 47/748 |
| | | | 709/226 |

\* cited by examiner

TRACKING AND FACTORING APPLICATION NEAR MISSES/TIMEOUTS INTO PATH SELECTION AND MULTIPATHING STATUS

BACKGROUND OF THE INVENTION

Field of the Invention

The present invention relates in general computing systems, and more particularly to, various embodiments for performance enhancement and error diagnosis in data networks.

Description of the Related Art

Today with modern technology, large volumes of data are storable on disk drives; these drives can exist as a solo entity, or as part of a broader make up within a larger storage environment, for example as part of a Storage Area Network (SAN). As the sheer volume of data in today's information-based society continues to increase, so too does the demands placed on communications and data processing infrastructures that serve to manipulate, transfer, and otherwise handle this data.

SUMMARY OF THE INVENTION

As SAN complexity and speeds continue to increase, the impacts of Input/Output (I/O) timeouts and communication path failures have been heavily focused upon in the past few years. Improvements have been made across networking components related to timeout handling and multipath selections. However, one area that continues to plague users and have a large impact on performance is continual near timeout (near-miss) events.

In the field, near misses/near timeouts an often have larger performance impacts than true communications failures. Continual near misses can grind performance to a halt, but may never be logged since the set thresholds for failure events were never crossed but were rather continually approached. There are currently no multipath actions taken or relationship between the application layer near misses and multipath layer path selections.

Accordingly and in view of the foregoing, to address the challenges previously described, various embodiments for management of multipath I/O in a computing system by a processor device are provided. In one such embodiment, by way of example only, a method for management of multipath I/O is provided. Upon surpassing a threshold for at least one predetermined criterion associated with near timeouts/near misses in the multipath I/O, a system notification is provided that is usable by the processor device to perform a multipath layer path selection to make pathing updates aimed at reducing near timeouts/near misses in the multipath I/O path.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, SAN complexity and speeds continue to increase, the impacts of Input/Output (I/O) timeouts and communication path failures have been heavily focused upon in the past few years. Improvements have been made across networking components related to timeout handling and multipath selections. However, one area that continues to plague users and have a large impact on performance is continual near timeout (near-miss) events.

In the field, near misses/near timeouts an often have larger performance impacts than true communications failures. Continual near misses can grind performance to a halt, but may never be logged since the set thresholds for failure events were never crossed but were rather continually approached. There are currently no multipath actions taken or relationship between the application layer near misses and multipath layer path selections.

Accordingly and in view of the foregoing, to address the challenges previously described, various embodiments for management of multipath I/O in a computing system by a processor device are provided. In one such embodiment, by way of example only, a method for management of multipath I/O is provided. Upon surpassing a threshold for at least one predetermined criterion associated with near timeouts/near misses in the multipath I/O, a system notification is provided that is usable by the processor device to perform a multipath layer path selection to make pathing updates aimed at reducing near timeouts/near misses in the multipath I/O paths.

Figure 1:
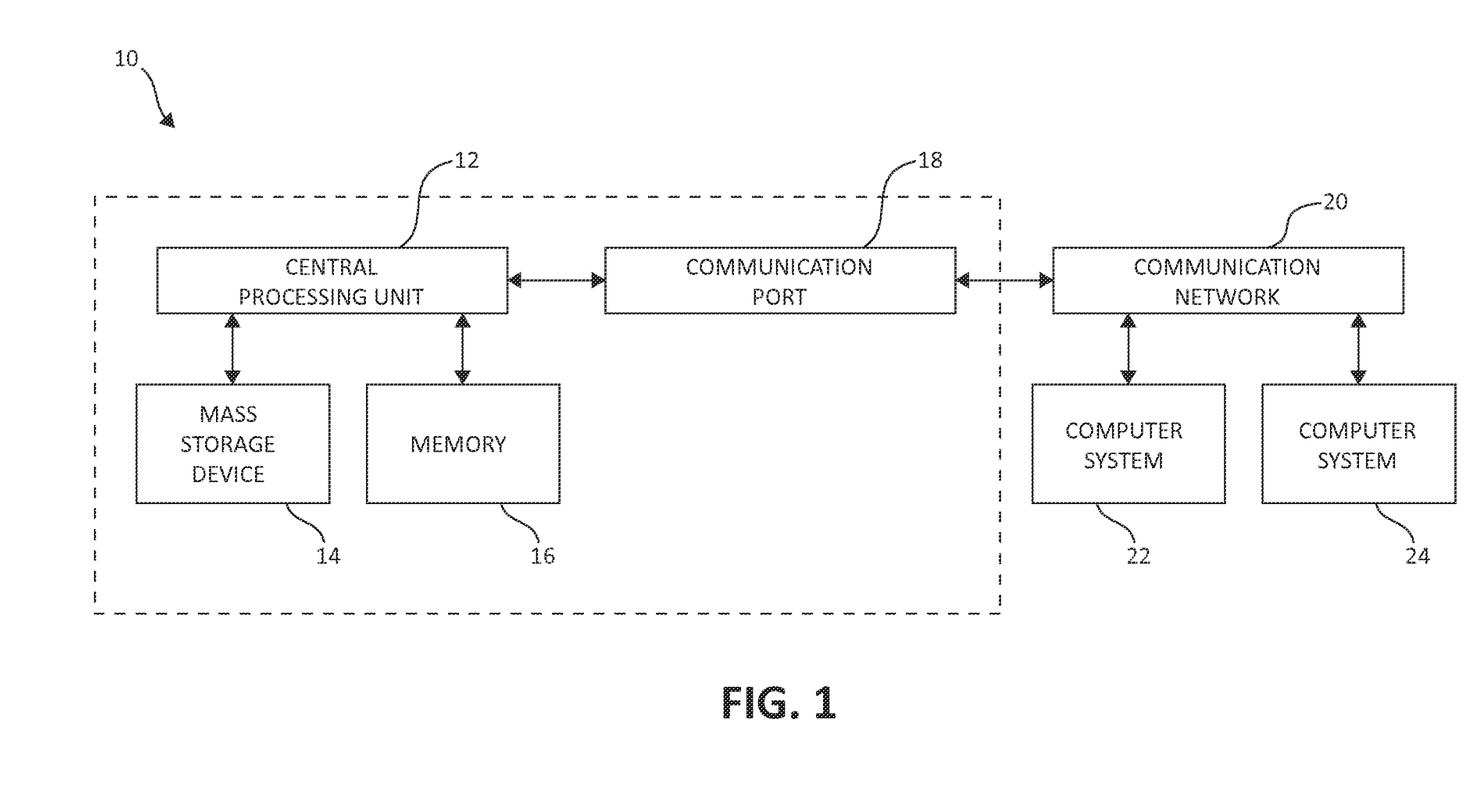
FIG. 1 is a block diagram showing an exemplary hardware structure for effecting management of multipath I/O, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
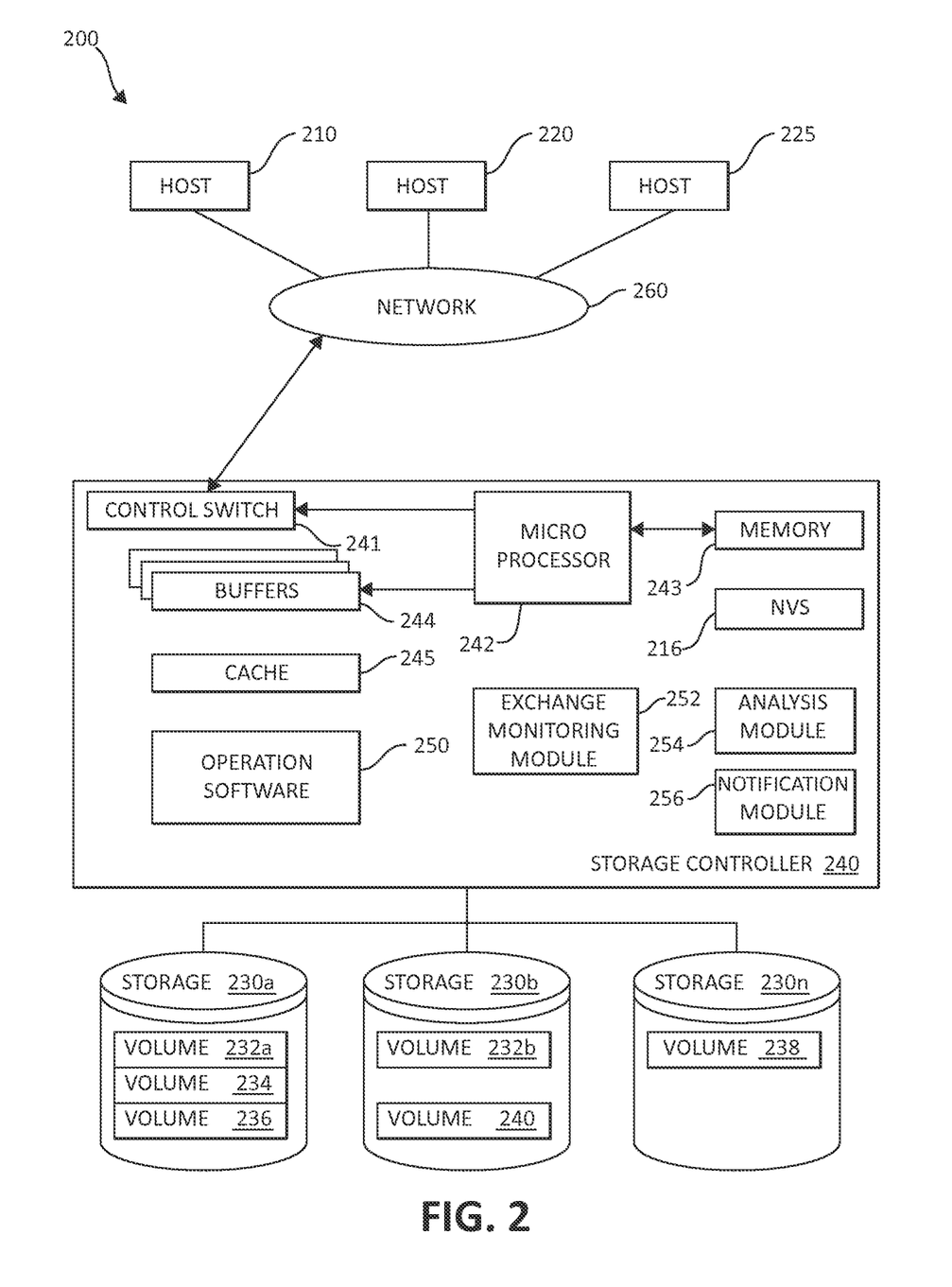
FIG. 2 is an additional block diagram of an additional exemplary hardware structure, specifically portions of a SAN, again in which aspects of the present invention may be realized.

FIG. 2 is an exemplary block diagram 200 showing a hardware structure of a data storage and management system (specifically, portions of a SAN 200) that may be used in the overall context of performing multipath I/O management in accordance with the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes and other network components known to one of ordinary skill in the art.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260. While one data connection between components (such as between storage 230 and storage controller 240, and network connection 260 and cluster hosts 210, 220, and 225) is shown for purposes of brevity, one of ordinary skill in the art will appreciate that a number of network connections, or "paths" may be found in a particular system or scenario in which data is transferred. These paths form the multipath architecture of storage networks in which the mechanisms of the present invention are concerned, among other aspects.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include operation software 250, an exchange-monitoring module 242, an analysis module 254, and a notification module 256. The operation software 250, exchange-monitoring module 242, analysis module 254, and notification module 256 may work in conjunction with each and every component of the storage controller 240, the hosts 210, 220, 225, and storage devices 230. The operation software 250, exchange-monitoring module 242, analysis module 254, and notification module 256 may be structurally one complete module or may be associated and/or included with other individual modules. The operation software 250, exchange-monitoring module 242, analysis module 254, and notification module 256 may also be located in the cache 245 or other components of portion 200.

The operation software 250, exchange-monitoring module 242, analysis module 254, and notification module 256 may individually and/or collectively perform various aspects of the present invention as will be further described. For example, the operation software 250 may contain executable code for performing multipath management functionality. The exchange-monitoring module 252 may implement one or more monitoring processes that monitor data exchanges across particular communication paths. The analysis module 254 may analyze the activity across such data exchanges and their correspondence and association with near timeout events/near miss events. Finally, the notification module 256 may send notification messages to other components in the portion 200 or elsewhere about various findings or multipath management actions taken.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the base-block generation module 257, the audio waveform module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment of the present invention, a novel monitoring process is introduced that, for example, captures data related to near misses and correlates this data. When thresholds are surpassed for given criteria, the monitoring process would send a path near-miss summary message to the multipathing layer suggesting that the path be downgraded. The multipathing software will track these near miss messages, and will update its multipathing choices as appropriate. The advantage of this exemplary implementation provides, for example, is performance benefits across paths along with early detection of problematic paths related to near timeouts not currently tracked. In view of the exemplary hardware structures depicted in FIGS. 1 and 2 previously, the mechanisms of the present invention may, as one of ordinary skill in the art will appreciate, be implemented in a wide variety of physical locations including, but not limited to Host-Bus Adapters (HBAs), Converged Network Adapters (CNAs), switch ports, storage ports, and the like.

The mechanisms of the illustrated embodiments may be applied to a variety of use cases, including the following. For example, the mechanisms may perform trending and data analysis functions relating to timer near-misses and related I/O paths. The mechanisms may be useful for tracking of I/O redrives and near redrives. The mechanisms may be embodied in a multipath driver, to be used in algorithm path choices. Additionally, the mechanisms may provide valuable information to be passed up to the application layer as well for decisions on which nodes have the best response time paths for critical data.

Figure 3:
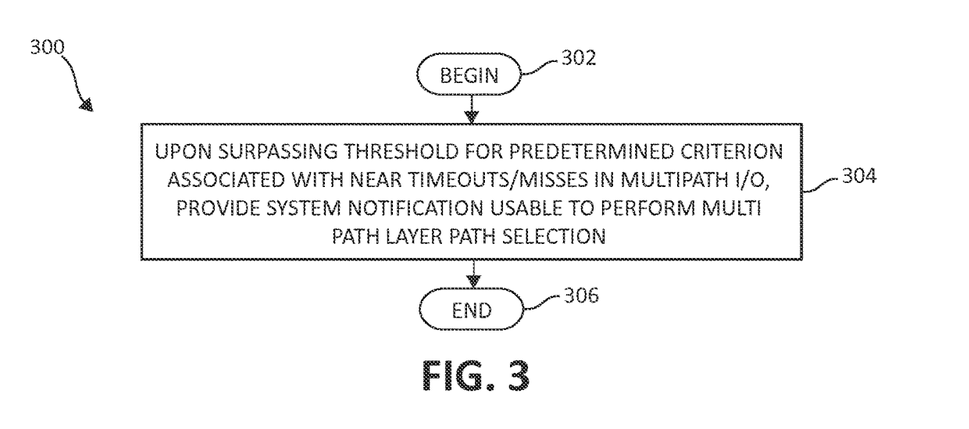
FIG. 3 is a flow chart diagram of an exemplary method for management of multipath I/O, here again in which aspects of the present invention may be implemented.

Turning now to FIG. 3, following, a flow chart diagram of an exemplary method 300 for tracking and factoring application near misses/timeouts into path selection and multipathing status is depicted. Method 300 begins (step 302) with, upon surpassing a threshold for one or more predetermined criterion associated with near timeouts/misses in multipath input/output, a system notification is provided which is usable by various entities to perform multipath layer selection, among other management functions (step 304). The method 300 then ends (step 306).

Figure 4:
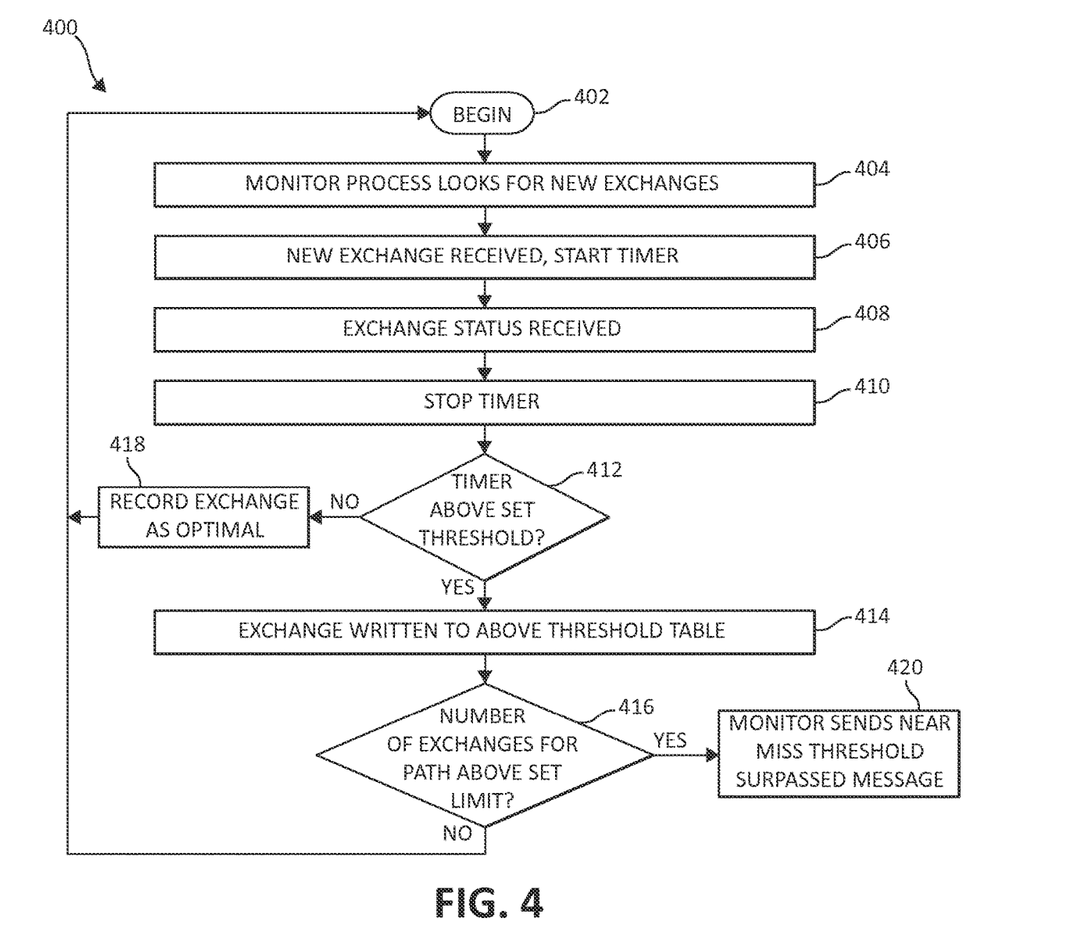
FIG. 4 is an additional flow chart diagram of an additional exemplary method for management of multipath I/O in which aspects of the present invention may be implemented.

FIG. 4, following, is an additional flow chart diagram of an additional exemplary method 400 for performing tracking and factoring functionality according to the illustrated embodiments. Method 400 describes such tracking and factoring functionality in additional exemplary detail, although one of ordinary skill in the art will appreciate that a variety of methodologies for tracking and performing analysis functionality towards multipath I/O may be contemplated.

Method 400 begins (step 402) with the implementation of a monitoring process that identifies one or more new data exchanges in the network (step 404). Once the new exchange is received by the process, a timer is commenced to monitor the exchange (step 406). One or more exchange status(es) are received by the process relating, for example, to near misses/near timeouts in various forms (step 408). The exchange status triggers the monitoring process to stop the timer (step 410)

Consider the following example. The monitoring process identifies a new data transfer exchange. The timer is started commensurate with the beginning of the data transfer operation across a particular path. An exchange status is received that the data transfer has completed. The monitoring process then stops the timer commensurate with the receipt of the exchange status.

As a following decision step 412, the method 400 queries whether the measured time (by the timer) is above a predetermined set threshold time. If not, the exchange is recorded as optimal (step 418), and the method 400 continues the monitoring process to identify new changes by returning to step 402.

Alternatively, if the measured time is found to be above the set threshold (again, step 412), the instant exchange is written to an "above threshold" log, such as a table (step 414). In a following decision step 416, method 400 queries whether a number of exchanges recorded for this particular path have exceeded a set limit (step 416). If so, a system notification may be sent, for example (in this case a "near miss threshold surpassed" message) to an entity of authority for decision-making purposes (step 420).

As one skilled in the art will appreciate, a variety of steps may be taken pursuant to the information provided by the system notification. For example, a decision may be made to "downgrade" paths having high near-miss counts (i.e., those paths having counts surpassing the set thresholds). By doing so, the PO's traversing those paths will be reduced, which may result in near-miss reductions.

Returning to decision step 416, if the limit is not exceeded by the recordation of this particular exchange coming in above the set threshold, then the method 400 returns to step 402 to begin the process of looking for new exchanges.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for management of multipath Input/Output (I/O) in a computing system by a processor device, comprising:
   identifying one or more data exchanges between a first network endpoint and a second network endpoint in a storage area network (SAN), wherein a respective data exchange of the one or more data exchanges comprises data being transmitted from the first network endpoint to the second network endpoint over a particular network path of a plurality of network paths connecting the first network endpoint and the second network endpoint, and wherein a timeout of the respective data exchange occurs when the data fails to be completely transmitted from the first network endpoint to the second network endpoint within a first threshold of a predetermined amount of time;
   responsive to identifying the one or more data exchanges, monitoring each of the one or more data exchanges by commencing a timer commensurate with a beginning of the data being transmitted from the first network endpoint in the respective data exchange, and stopping the timer commensurate with a receipt of an exchange status that the data has been completely received by the second network endpoint in the respective data exchange;
   responsive to monitoring each of the one or more data exchanges, detecting that a particular data exchange of the one or more data exchanges has surpassed a near miss threshold for at least one predetermined criterion, wherein at least one of the predetermined criterion comprises a second threshold of a predetermined amount of time shorter than the first threshold of the predetermined amount of time;
   responsive to detecting that the particular data exchange has surpassed the near miss threshold, associating the particular data exchange with the particular network path for building and trending statistical information associated with near misses/timeouts, wherein the associating includes logging the particular data exchange and the particular network path as an entry on a table, the table further tracking I/O redrives and I/O near redrives;
   responsive to determining that a number of the entries on the table for the particular network path have exceeded a set limit, providing a system notification usable by the processor device to perform a multipath layer path selection to make pathing updates aimed at reducing the near misses/timeouts in the multipath I/O; and
   receiving the statistical information by the multipathing layer and executing the multipath layer selection based on the system notification, wherein responsive to the number of entries on the table surpassing the set limit for the particular path, the particular path is downgraded.

2. The method of claim 1, further including defining the at least one predetermined criterion.

3. The method of claim 1, wherein providing the system notification includes sending a path near miss summary message to a multipathing layer.

4. The method of claim 1, wherein monitoring each exchange further includes determining if a quantity of each exchange for a particular path exceeds a predetermined limit.

5. A system for management of multipath Input/Output (I/O) in a computing system, comprising:
   a processor device; and
   a memory device storing instructions executed by the processor device, wherein, the processor device, when executing the instructions:
   identifies one or more data exchanges between a first network endpoint and a second network endpoint in a storage area network (SAN), wherein a respective data exchange of the one or more data exchanges comprises data being transmitted from the first network endpoint to the second network endpoint over a particular network path of a plurality of network paths connecting the first network endpoint and the second network endpoint, and wherein a timeout of the respective data exchange occurs when the data fails to be completely transmitted from the first network endpoint to the second network endpoint within a first threshold of a predetermined amount of time;
   responsive to identifying the one or more data exchanges, monitors each of the one or more data exchanges by commencing a timer commensurate with a beginning of the data being transmitted from the first network endpoint in the respective data exchange, and stopping the timer commensurate with a receipt of an exchange status that the data has been completely received by the second network endpoint in the respective data exchange;
   responsive to monitoring each of the one or more data exchanges, detects that a particular data exchange of the one or more data exchanges has surpassed a near miss threshold for at least one predetermined criterion, wherein at least one of the predetermined criterion comprises a second threshold of a predetermined amount of time shorter than the first threshold of the predetermined amount of time;
   responsive to detecting that the particular data exchange has surpassed the near miss threshold, associates the particular data exchange with the particular network path for building and trending statistical information associated with near misses/timeouts, wherein the associating includes logging the particular data exchange and the particular network path as an entry on a table, the table further tracking I/O redrives and I/O near redrives;
   responsive to determining that a number of the entries on the table for the particular network path have exceeded a set limit, provides a system notification usable by the processor device to perform a multipath layer path selection to make pathing updates aimed at reducing the near misses/timeouts in the multipath I/O; and
   receives the statistical information by the multipathing layer and executing the multipath layer selection based on the system notification, wherein responsive to the number of entries on the table surpassing the set limit for the particular path, the particular path is downgraded.

6. The system of claim 5, wherein, when executing the instructions, the processor device defines the at least one predetermined criterion.

7. The system of claim 5, wherein the processor device, when executing the instructions and pursuant to providing the system notification, sends a path near miss summary message to a multipathing layer.

8. The system of claim 5, wherein the processor device, when executing the instructions and pursuant to monitoring each exchange, determines if a quantity of each exchange for a particular path exceeds a predetermined limit.

9. The system of claim 5, further including at least one of a Host-Bus Adapter (HBA), Converged Network Adapter (CNA), switch port, and storage port, each in operable communication with the processor device.

10. A computer program product for management of multipath Input/Output (I/O) in a computing system by a processor device, the computer program product comprising a non-transitory computer-readable storage medium having computer-readable program code portions stored therein, the computer-readable program code portions comprising:

a first executable portion that:

identifies one or more data exchanges between a first network endpoint and a second network endpoint in a storage area network (SAN), wherein a respective data exchange of the one or more data exchanges comprises data being transmitted from the first network endpoint to the second network endpoint over a particular network path of a plurality of network paths connecting the first network endpoint and the second network endpoint, and wherein a timeout of the respective data exchange occurs when the data fails to be completely transmitted from the first network endpoint to the second network endpoint within a first threshold of a predetermined amount of time;

responsive to identifying the one or more data exchanges, monitors each of the one or more data exchanges by commencing a timer commensurate with a beginning of the data being transmitted from the first network endpoint in the respective data exchange, and stopping the timer commensurate with a receipt of an exchange status that the data has been completely received by the second network endpoint in the respective data exchange;

responsive to monitoring each of the one or more data exchanges, detects that a particular data exchange of the one or more data exchanges has surpassed a near miss threshold for at least one predetermined criterion, wherein at least one of the predetermined criterion comprises a second threshold of a predetermined amount of time shorter than the first threshold of the predetermined amount of time;

responsive to detecting that the particular data exchange has surpassed the near miss threshold, associates the particular data exchange with the particular network path for building and trending statistical information associated with near misses/timeouts, wherein the associating includes logging the particular data exchange and the particular network path as an entry on a table, the table further tracking I/O redrives and I/O near redrives;

responsive to determining that a number of the entries on the table for the particular network path have exceeded a set limit, provides a system notification usable by the processor device to perform a multipath layer path selection to make pathing updates aimed at reducing the near misses/timeouts in the multipath I/O; and receives the statistical information by the multipathing layer and executing the multipath layer selection based on the system notification, wherein responsive to the number of entries on the table surpassing the set limit for the particular path, the particular path is downgraded.

11. The computer program product of claim 10, further including a second executable portion that defines the at least one predetermined criterion.

12. The computer program product of claim 10, further including a second executable portion that, pursuant to providing the system notification, sends a path near miss summary message to a multipathing layer.

13. The computer program product of claim 10, further including a second executable portion that, pursuant to monitoring each exchange, determines if a quantity of each exchange for a particular path exceeds a predetermined limit.

* * * * *